(12) United States Patent
Kano et al.

(10) Patent No.: US 11,585,395 B2
(45) Date of Patent: Feb. 21, 2023

(54) TRANSMISSION DEVICE AND METHOD OF CONTROLLING TRANSMISSION DEVICE

(71) Applicant: HONDA MOTOR CO., LTD., Tokyo (JP)

(72) Inventors: Junichiro Kano, Wako (JP); Tatsuya Ryuzaki, Wako (JP); Junya Ono, Wako (JP); Yoshiaki Nedachi, Wako (JP); Go Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 17/437,868

(22) PCT Filed: Mar. 10, 2020

(86) PCT No.: PCT/JP2020/010257
§ 371 (c)(1),
(2) Date: Sep. 10, 2021

(87) PCT Pub. No.: WO2020/184552
PCT Pub. Date: Sep. 17, 2020

(65) Prior Publication Data
US 2022/0170520 A1 Jun. 2, 2022

(30) Foreign Application Priority Data
Mar. 13, 2019 (JP) .............................. JP2019-045973

(51) Int. Cl.
*F16D 48/06* (2006.01)
*F16D 48/02* (2006.01)
(Continued)

(52) U.S. Cl.
CPC ............. *F16D 48/02* (2013.01); *F16D 48/06* (2013.01); *F16H 59/02* (2013.01); *F16H 61/02* (2013.01)

(58) Field of Classification Search
CPC .. F16D 48/02; F16D 48/06; F16D 2500/1083; F16H 59/02; F16H 61/02; F16H 2059/0221
See application file for complete search history.

(56) References Cited

U.S. PATENT DOCUMENTS 5,056,376 A * 10/1991 Moroto ............... F16H 61/0248
74/900
9,062,764 B2 * 6/2015 Kojima ................... F16H 61/12
(Continued)

FOREIGN PATENT DOCUMENTS

DE 102013218891 4/2014
EP 2716937 4/2014
(Continued)

OTHER PUBLICATIONS

International Search Report and Written Opinion for International Application No. PCT/JP2020/010257 dated Jun. 9, 2020, 9 pages.
(Continued)

*Primary Examiner* — Edwin A Young
(74) *Attorney, Agent, or Firm* — Amin, Turocy & Watson, LLP

(57) ABSTRACT

This transmission device includes a mode changeover switch (59) on which a mode changeover operation between a manual mode (M2) and an automated mode (M1) is externally performed, other operation unit (80) on which a predetermined shift operation is externally performed separately from the mode changeover switch (59), and a control unit (60) configured to control a mode changeover between the manual mode (M2) and the automated mode (M1). The control unit (60) executes the mode changeover between the manual mode (M2) and the automated mode (M1) on the basis of the mode changeover operation on the mode changeover switch (59). When the shift operation on the other operation unit (80) has been performed, the control unit (60) executes the mode changeover between the manual mode (M2) and the automated mode (M1).

5 Claims, 9 Drawing Sheets

(51) Int. Cl.
*F16H 59/02* (2006.01)
*F16H 61/02* (2006.01)

(56) References Cited

U.S. PATENT DOCUMENTS

| | | | |
|---|---|---|---|
| 2012/0004818 A1 | 1/2012 | Wakita et al. | |
| 2014/0095034 A1* | 4/2014 | Nedachi | F16D 48/06 |
| | | | 701/52 |
| 2014/0095039 A1* | 4/2014 | Kojima | F16D 48/062 |
| | | | 701/68 |
| 2018/0283476 A1 | 10/2018 | Kojima et al. | |

FOREIGN PATENT DOCUMENTS

| | | |
|---|---|---|
| JP | 08-023713 | 1/1996 |
| JP | 2012-006564 | 1/2012 |
| JP | 2014-070686 | 4/2014 |
| JP | 2014-074424 | 4/2014 |
| JP | 2016-114230 | 6/2016 |

OTHER PUBLICATIONS

Indian Office Action for Indian Patent Application No. 202117044900 dated Mar. 9, 2022.

* cited by examiner

FIG. 7

| | CLUTCH-BY-WIRE SYSTEM | |
|---|---|---|
| | AUTOMATED MODE | MANUAL MODE |
| START | AUTOMATED START<br>MANUAL START (ENGINE FAILURE AVOIDANCE) | MANUAL START |
| SHIFT | SHIFTER + CLUTCH CONTROL<br>MANUAL SHIFT (ENGINE FAILURE AVOIDANCE) | SHIFTER + CLUTCH CONTROL<br>MANUAL SHIFT |
| STOP | AUTOMATICALLY TURN OFF CLUTCH<br>TURN OFF CLUTCH IN MANUAL OPERATION | TURN OFF CLUTCH IN MANUAL OPERATION |
| LEVER | PRESENT<br>(PRESENCE OF ENGINE FAILURE AVOIDANCE) | PRESENT<br>(ABSENCE OF ENGINE FAILURE AVOIDANCE) |

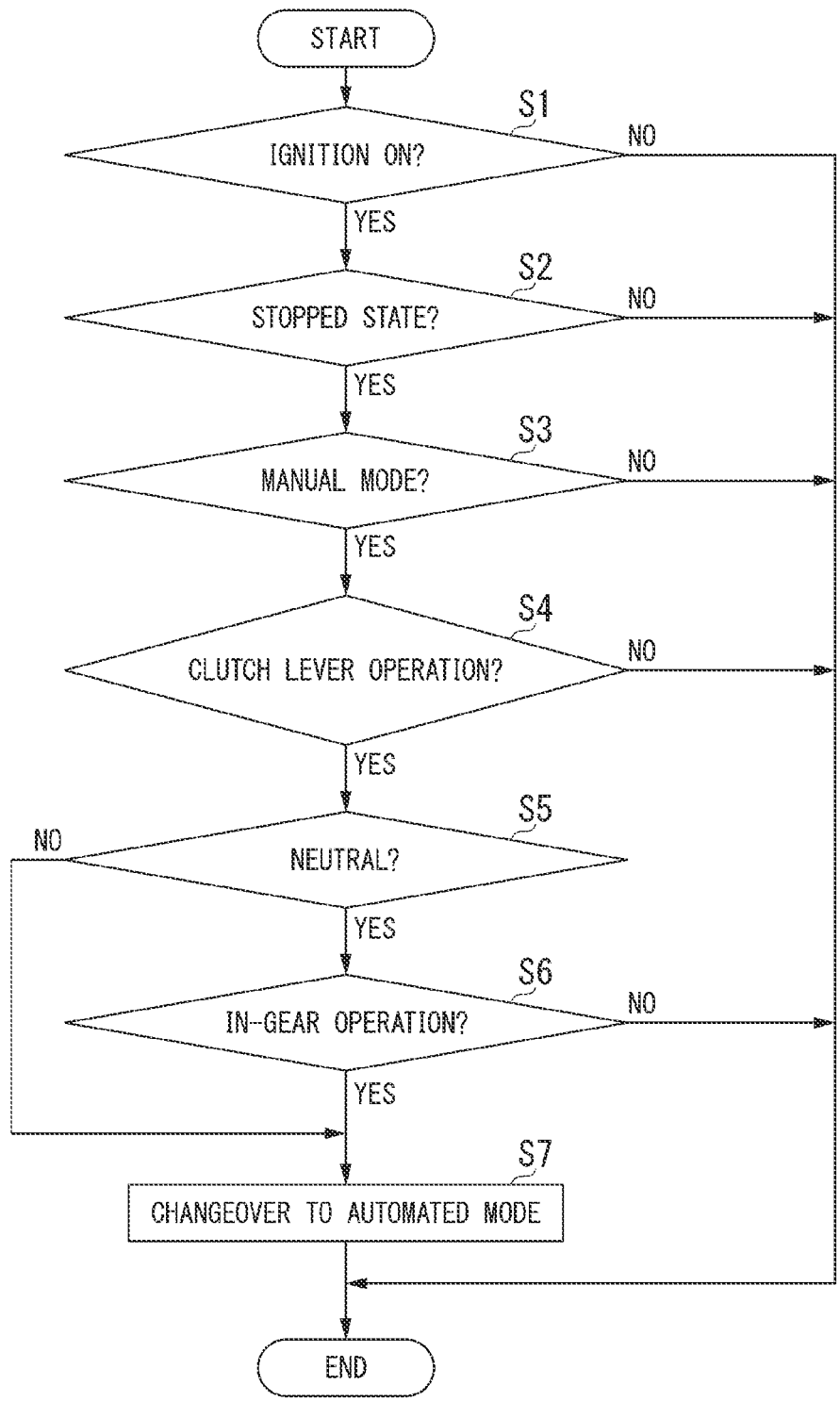

TRANSMISSION DEVICE AND METHOD OF CONTROLLING TRANSMISSION DEVICE

TECHNICAL FIELD

The present invention relates to a transmission device and a method of controlling the transmission device.

The present application claims priority based on Japanese Patent Application No. 2019-045973 filed on Mar. 13, 2019, the contents of which are incorporated herein by reference.

BACKGROUND ART

Conventionally, motorcycle control devices may have an automated mode and a manual mode as transmission control modes (see, for example, Patent Document 1).

The control device in Patent Document 1 controls a transmission so that a shift ratio of the transmission becomes a shift ratio based on a driving state of a vehicle in the automated mode. In the manual mode, the control device controls the transmission according to a shift request received from a shift operating member (for example, a shift pedal, a shift switch, or the like). A changeover between the automated mode and the manual mode is generally performed by operating a mode changeover switch.

RELATED ART DOCUMENT

Patent Document

Patent Document 1: Japanese Unexamined Patent Application, First Publication No. 2016-114230

SUMMARY

Problems to be Solved by the Invention

Patent Document 1 discloses a configuration in which a driver can select a mode by operating the mode changeover switch when he or she performs an operation on a clutch lever. However, it is troublesome for an occupant to operate both the clutch lever and the mode changeover switch in order to perform the mode changeover.

Also, in a transmission device in which a changeover between the automated mode and the manual mode is possible, the occupant may misrecognize whether the control mode of the transmission at that point in time is the automated mode or the manual mode to perform the operation. For example, there are problems that the occupant misrecognizes that the mode is the automated mode in a state in which the vehicle is stopped when the control mode is the manual mode and an in-gear operation is performed on the shift operating member without any operation on the clutch lever and the like.

Therefore, an objective of the present invention is to simplify a mode changeover operation and enable a shift operation in consideration of an intention of a driver even if the driver misrecognizes a control mode in a transmission device in which the settings of a manual mode and an automated mode can be changed and a method of controlling the transmission device.

Means for Solving the Problem

As the solution to the above-described problems, aspects of the present invention have the following configurations.

(1) According to a first aspect of the present invention, there is provided a transmission device, which is able to switch a mode between a manual mode in which a clutch device is connected and disconnected according to an operation on a clutch operating element and an automated mode in which the clutch device is connected and disconnected without any operation on the clutch operating element, the transmission device including: a mode changeover switch on which a mode changeover operation between the manual mode and the automated mode is externally performed; other operation unit on which a predetermined shift operation is externally performed separately from the mode changeover switch; and a control unit configured to control a mode changeover between the manual mode and the automated mode, wherein the control unit executes the mode changeover between the manual mode and the automated mode on the basis of the mode changeover operation on the mode changeover switch, wherein, when the shift operation has been performed on the other operation unit, the control unit executes the mode changeover between the manual mode and the automated mode, wherein the other operation unit comprises a shift operating element configured to perform an operation on a transmission, and wherein, when there is no operation on the clutch operating element and the operation is performed on the shift operating element in a state in which the mode is set to the manual mode, the control unit executes a changeover from the manual mode to the automated mode.

(2) In the transmission device according to the above-described aspect (1), the other operation unit may include the clutch operating element configured to perform an operation on the clutch device.

(3) In the transmission device according to the above-described aspect (2), if there is no operation on the clutch operating element and an in-gear operation is performed on the shift operating element when the transmission is in a neutral state in a state in which the mode is set to the manual mode, the control unit may execute the changeover from the manual mode to the automated mode.

(4) In the transmission device according to any one of the above-described aspects (1), when a vehicle speed is less than a predetermined specified value, the control unit may execute the mode changeover between the manual mode and the automated mode if the shift operation has been performed on the other operation unit.

(5) According to a second aspect of the present invention, there is provided a method of controlling the transmission device according to the above-described aspects (1), the method including: an operation detection step of detecting that the shift operation has been performed on the other operation unit in a state in which the mode is set to the manual mode; and a mode changeover step of executing a changeover from the manual mode to the automated mode when it is detected that the shift operation has been performed in the operation detection step.

Advantage of the Invention

According to the transmission device described in the above-described aspect (1) of the present invention, in addition to the mode changeover operation on the mode changeover switch, the changeover between the manual mode and the automated mode is also executed when the shift operation has been performed on the other operation unit. If the other operation unit is an operating element for the transmission or the clutch, it is possible to execute the changeover from the manual mode to the automated mode in only the normal in-gear operation, for example, in a case in which the in-gear operation has been performed without any clutch operation in the manual mode or the like. In this way, it is possible to simplify the mode changeover operation and execute the shift operation and the mode changeover in consideration of an intention of the driver even if it is determined that the driver is performing the shift operation by misrecognizing the control mode.

In addition, when there is no operation on the clutch operating element and the operation is performed on the shift operating element in the state in which the mode is set to the manual mode, the changeover from the manual mode to the automated mode is executed. Thereby, even if it is determined that the driver is performing the shift operation by misrecognizing the control mode, it is possible to execute the shift operation and the mode changeover in consideration of the intention of the driver.

According to the transmission device described in the above-described aspect (2) of the present invention, when there is no operation on the clutch operating element and the operation is performed on the shift operating element in the state in which the mode is set to the manual mode, the changeover from the manual mode to the automated mode is executed. Thereby, even if it is determined that the driver is performing the shift operation by misrecognizing the control mode, it is possible to execute the shift operation and the mode changeover in consideration of the intention of the driver.

According to the transmission device described in the above-described aspect (3) of the present invention, the changeover from the manual mode to the automated mode is executed if the in-gear operation has been performed without the clutch operation when the transmission is in the neutral state. Thereby, even if it is determined that the driver is performing the in-gear operation by misrecognizing the control mode, it is possible to avoid a shift shock and an engine failure and execute the shift operation and the mode changeover in consideration of the intention of the driver.

According to the transmission device described in the above-described aspect (4) of the present invention, the changeover between the manual mode and the automated mode can be executed only when the vehicle speed is less than the predetermined specified value and the shift operation is performed on the other operation unit. Thereby, the driver can perform the mode changeover unintentionally only at the time of low speed or at the time of stopping when a change in the behavior of the vehicle body is small.

According to the method of controlling the transmission device described in the above-described aspect (5) of the present invention, the changeover from the manual mode to the automated mode is executed when a shift operation is performed on the other operation unit in a state in which the mode is set to the manual mode. Thereby, it is possible to simplify the mode changeover operation and execute the shift operation and the mode changeover in consideration of an intention of the driver even if it is determined that the driver is performing the shift operation by misrecognizing the control mode.

BRIEF DESCRIPTION OF THE DRAWINGS

FIG. 7 is a diagram illustrating an example of a control mode of a clutch-by-wire system.
FIG. 10 is a flowchart illustrating automated mode changeover control according to the embodiment of the present invention.

DESCRIPTION OF THE EMBODIMENTS

Hereinafter, embodiments of the present invention will be described with reference to the drawings. In the following description, forward, rearward, left, and right directions and the like are the same as those in a vehicle to be described below unless otherwise mentioned. Also, an arrow FR indicating a forward direction with respect to the vehicle, an arrow LH indicating a left direction with respect to the vehicle, and an arrow UP indicating an upward direction with respect to the vehicle are shown in appropriate places in drawings used in the following description.

<Whole Vehicle>

Figure 1:
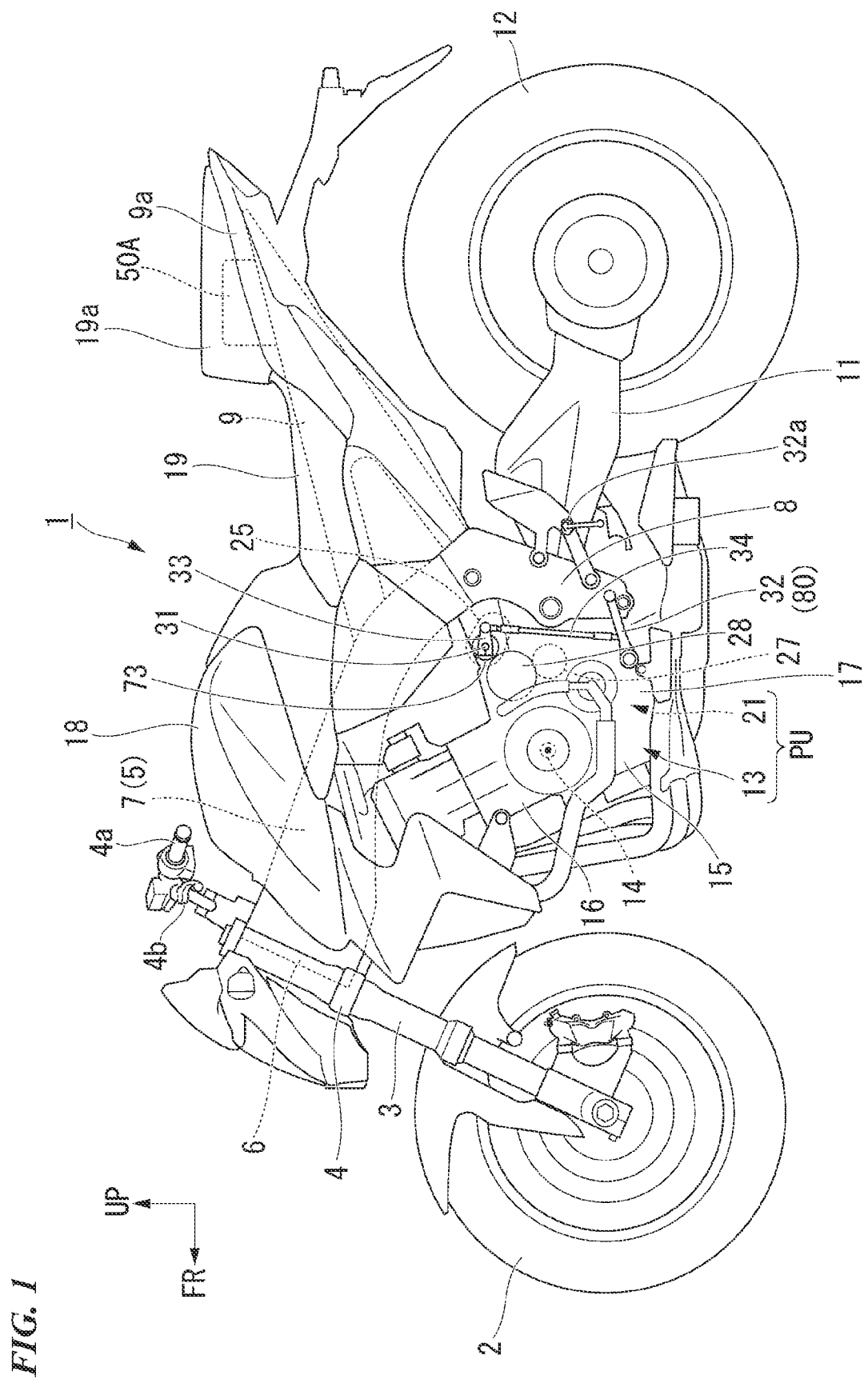
FIG. 1 is a left side view of a motorcycle according to an embodiment of the present invention.

As illustrated in FIG. 1, the present embodiment is applied to a motorcycle 1 that is a saddle riding-type vehicle. A front wheel 2 of the motorcycle 1 is supported by lower ends of one pair of left and right front forks 3. Upper parts of the left and right front forks 3 are supported by a head pipe 6 of a front end of a vehicle body frame 5 via a steering stem 4. A bar-type steering handle 4a is mounted on a top bridge of the steering stem 4.

The vehicle body frame 5 includes the head pipe 6, main tubes 7 that extend downward and rearward from the head pipe 6 at the center in a vehicle width direction (a left/right direction), left and right pivot frames 8 connected in the downward direction of a rear end of the main tubes 7 and a seat frame 9 connected in the rearward direction of the main tubes 7 and the left and right pivot frames 8. In the left and right pivot frames 8, a front end of a swing arm 11 is pivoted to be swingable. At a rear end of the swing arm 11, a rear wheel 12 of the motorcycle 1 is supported.

In the upward direction of the left and right main tubes 7, a fuel tank 18 is supported. In the upward direction of the seat frame 9 in the rearward direction of the fuel tank 18, a front seat 19 and a rear seat cover 19a are aligned in front of and behind each other and supported. The periphery of the seat frame 9 is covered with a rear cowl 9a. In the downward direction of the left and right main tubes 7, a power unit PU that is a motor of the motorcycle 1 is suspended. For example, the power unit PU is linked with the rear wheel 12 via a chain-type transmission mechanism.

The power unit PU integrally includes an engine (an internal combustion engine) 13 positioned on a front side of the power unit PU and a transmission 21 positioned on a rear side of the power unit PU. For example, the engine 13 is a multiple cylinder engine in which a rotary shaft of a crank shaft 14 is aligned in the left/right direction (the vehicle width direction). The engine 13 raises a cylinder 16 above a front part of a crank case 15. A rear part of the crank case 15 is formed as a transmission case 17 that accommodates the transmission 21.

<Transmission>

Figure 2:
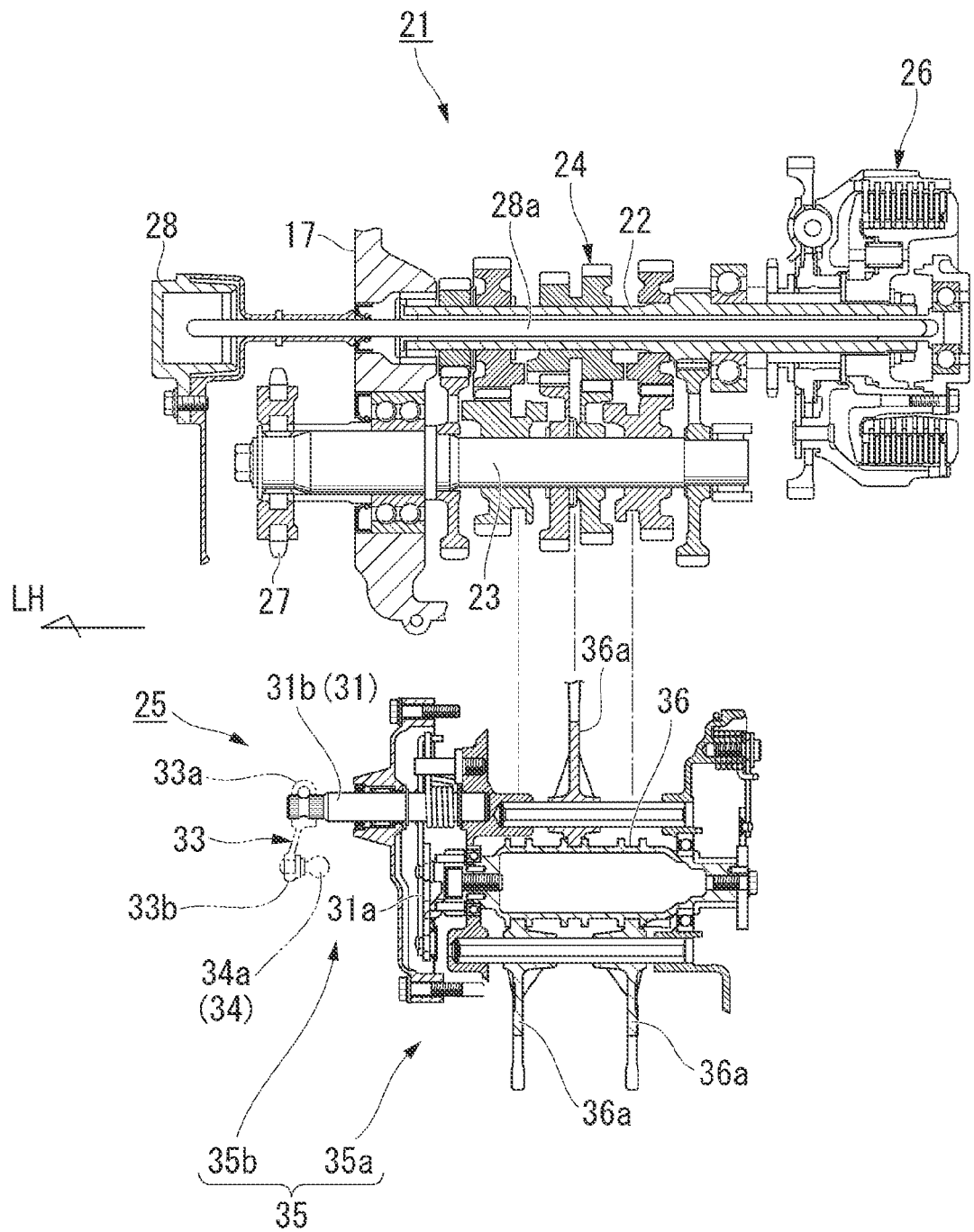
FIG. 2 is a cross-sectional view of a transmission and a change mechanism of the motorcycle.

As illustrated in FIG. 2, the transmission 21 is a stepped transmission including a main shaft 22, a counter shaft 23, and a transmission gear group 24 disposed across both shafts 22 and 23. The counter shaft 23 constitutes an output shaft of the transmission 21 and the power unit PU. An end of the counter shaft 23 protrudes to the left side of a rear part of the crank case 15 and is connected to the rear wheel 12 via the chain-type transmission mechanism.

The transmission gear group 24 includes gears corresponding to the number of shift stages supported at both shafts 22 and 23. The transmission 21 is of a constant engagement type in which a pair of corresponding gears of the transmission gear group 24 are constantly engaged with each other between the shafts 22 and 23. A plurality of gears supported at both shafts 22 and 23 can be classified into a free gear that can rotate with respect to a corresponding shaft and a slide gear (a shifter) that is spline-fitted to a corresponding shaft. One of the free gear and the slide gear has a convex dog provided in an axial direction and the other has a concave slot provided in the axial direction so that the slot is engaged with the dog. That is, the transmission 21 is a so-called dog mission.

Figure 3:
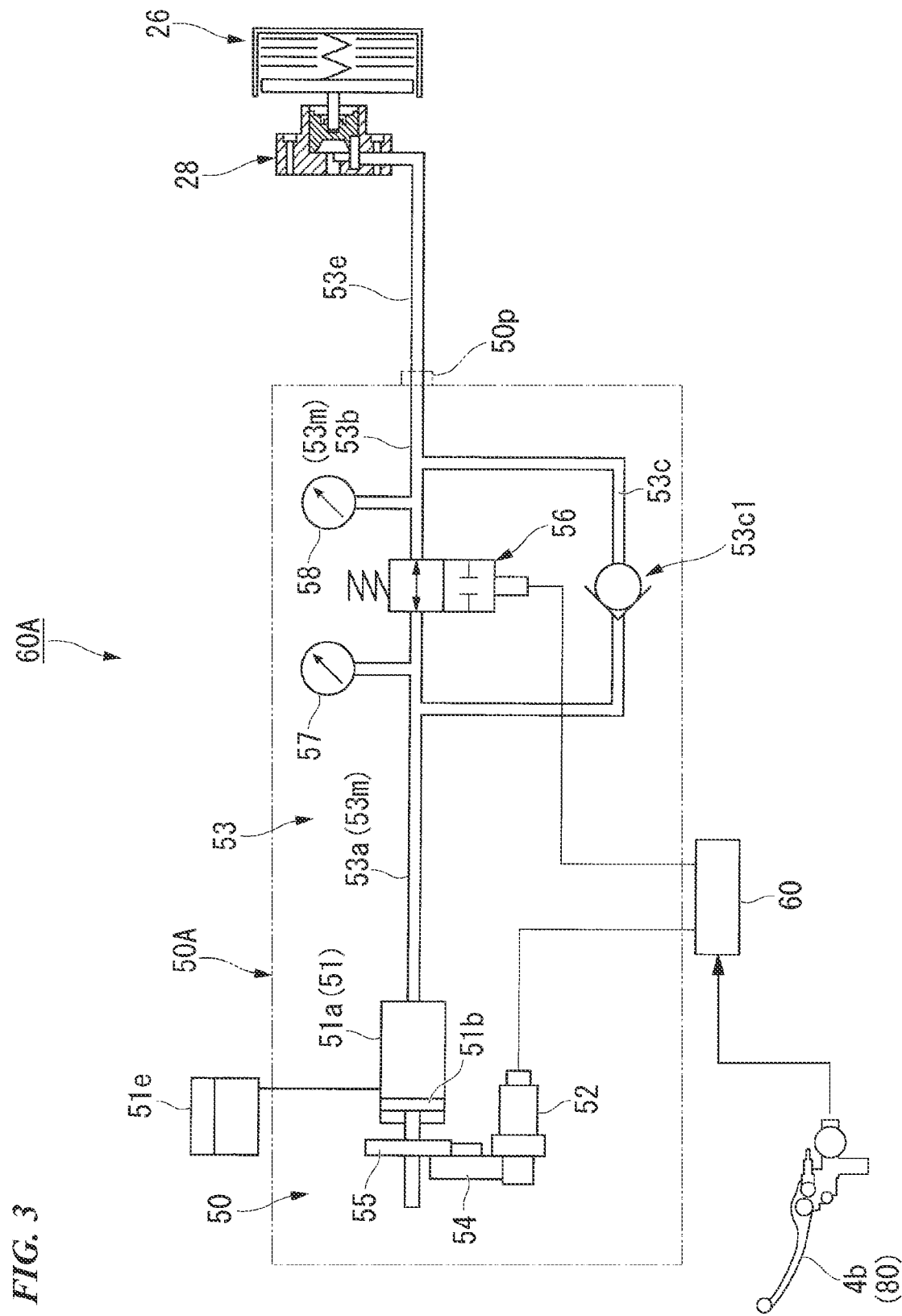
FIG. 3 is a schematic explanatory diagram of a clutch operating system including a clutch actuator.

Referring also to FIG. 3, the main shaft 22 and the counter shaft 23 of the transmission 21 are disposed to be aligned in front of and behind each other in the rearward direction of the crank shaft 14. A clutch device 26 operated by a clutch actuator 50 is coaxially disposed at a right end of the main shaft 22. For example, the clutch device 26 is a wet multiplate clutch and is a so-called normal open clutch. That is, the clutch device 26 reaches a connected state in which motive power transmission is enabled in accordance with the supply of a hydraulic pressure from the clutch actuator 50 and is returned to a disconnected state in which motive power transmission is disabled when there is no supply of the hydraulic pressure from the clutch actuator 50.

Referring to FIG. 2, rotation power of the crank shaft 14 is transmitted to the main shaft 22 via the clutch device 26 and is transmitted from the main shaft 22 to the counter shaft 23 via any gear pair of the transmission gear group 24. A drive sprocket 27 of the above-described chain-type transmission mechanism is attached to a left end of the counter shaft 23 that protrudes to the left side of a rear part of the crank case 15.

In the rearward and upward directions of the transmission 21, a change mechanism 25, which performs switching between gear pairs of the transmission gear group 24, is accommodated. The change mechanism 25 operates a plurality of shift forks 36a in accordance with the pattern of a lead groove formed on the outer periphery thereof in accordance with rotation of a shift drum 36 having a hollow cylindrical shape parallel to both shafts 22 and 23 and performs switching of a gear pair for use in motive power transmission between the shafts 22 and 23 in the transmission gear group 24.

The change mechanism 25 includes a shift spindle 31 parallel to the shift drum 36. In the change mechanism 25, at the time of rotation of the shift spindle 31, a shift arm 31a fixed to the shift spindle 31 rotates the shift drum 36, moves the shift fork 36a in the axial direction in accordance with the pattern of the lead groove, and switches a gear pair in which motive power transmission is enabled within the transmission gear group 24 (i.e., switches a shift stage).

The shift spindle 31 causes a shaft outer part 31b to protrude to an outward side (in the left direction) of the crank case 15 in the vehicle width direction such that the change mechanism 25 is operable. A shift load sensor 73 (a shift operation detecting means) is coaxially attached to the shaft outer part 31b of the shift spindle 31 (see FIG. 1). A swing lever 33 is attached to the shaft outer part 31b (or a rotary shaft of the shift load sensor 73) of the shift spindle 31. The swing lever 33 extends rearward from a base end part 33a that is fixed to the shift spindle 31 (or the rotary shaft) through clamp fixing and an upper end of a link load 34 is connected to a tip end part 33b thereof via an upper ball joint 34a so that it is freely swingable. A lower end of the link load 34 is connected to a shift pedal (a shift operating element) 32 that is operated by a driver using a foot via a lower ball joint (not illustrated) so that it is freely swingable.

As illustrated in FIG. 1, the shift pedal 32 has a front end supported at a lower part of the crank case 15 so that the shift pedal 32 is vertically swingable via a shaft in a left/right direction. A pedal part for hooking the driver's tiptoe placed on a step 32a is provided at a rear end of the shift pedal 32 and a lower end of the link load 34 is connected to a middle part in a front/back direction of the shift pedal 32.

As illustrated in FIG. 2, a shift change device 35, which includes the shift pedal 32, the link load 34, and the change mechanism 25 and performs gear switching of a gear shift step of the transmission 21, is configured. In the shift change device 35, an assembly (the shift drum 36, the shift forks 36a, and the like), which switches a shift stage of the transmission 21 inside the transmission case 17, will be referred to as a shift operating unit 35a and an assembly (the shift spindle 31, the shift arm 31a, and the like) that rotates around the shift spindle 31 when a shift operation for the shift pedal 32 is input and transmits this rotation to the shift operating unit 35a will be referred to as a shift operation receiving unit 35b.

Here, the motorcycle 1 employs a so-called semi-automated transmission system (an automated clutch-type transmission system) in which only a shift operation on the transmission 21 (a foot operation on the shift pedal 32) is performed by the driver and connection and disconnection operations on the clutch device 26 are automatically performed by electrical control in accordance with an operation on the shift pedal 32.

<Transmission System (Transmission Device)>

Figure 4:
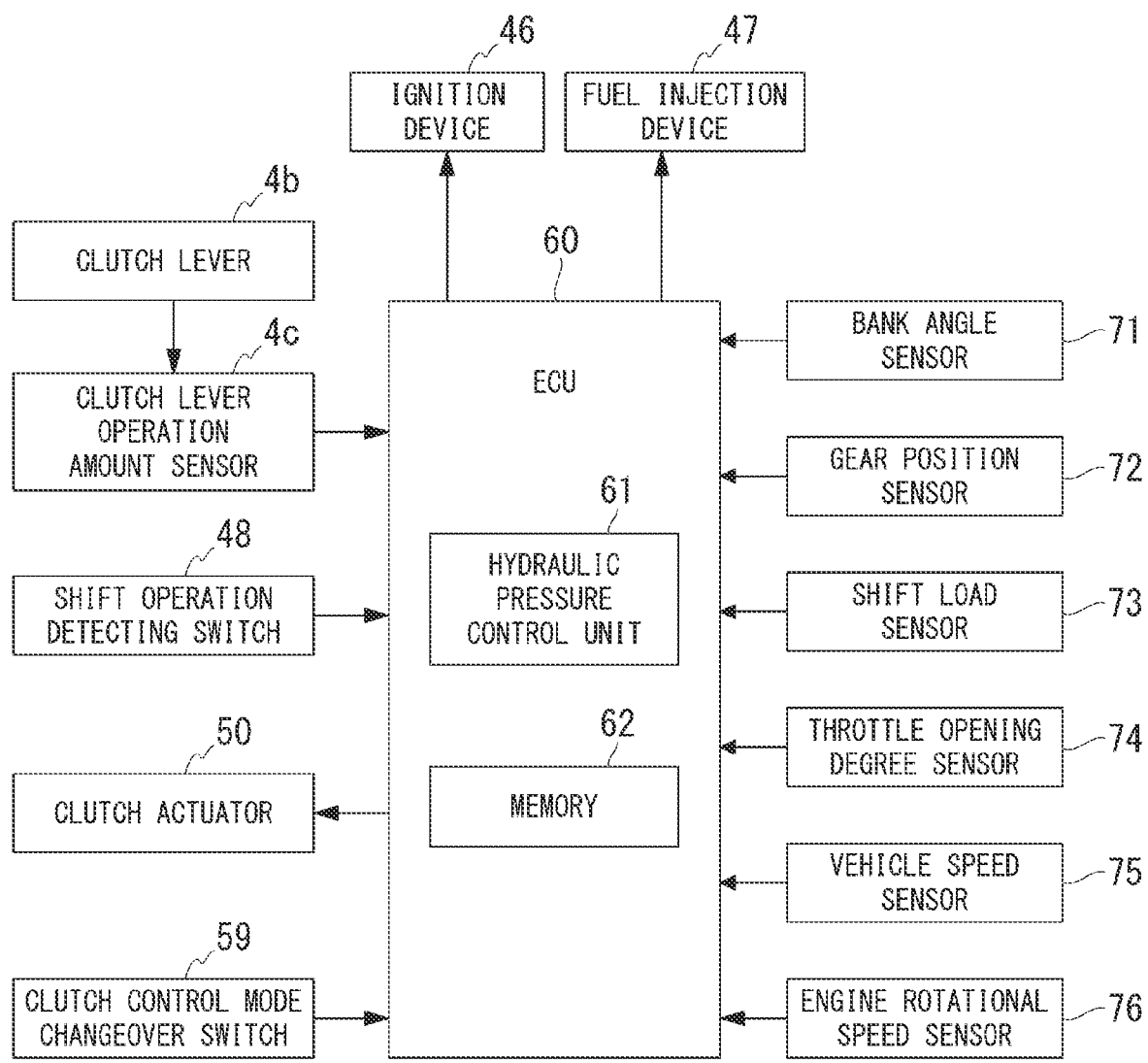
FIG. 4 is a block diagram of a transmission system.

As illustrated in FIG. 4, the above-described transmission system includes a clutch actuator 50, an electronic control unit (ECU) (control unit) 60, and various types of sensors 71 to 76.

The ECU 60 controls the operation of the clutch actuator 50 on the basis of detection information from a bank angle sensor 71 that detects a bank angle of the vehicle body, a gear position sensor 72 that detects a shift stage from a rotation angle of the shift drum 36 and a shift load sensor 73 (for example, a torque sensor) that detects an operation torque input to the shift spindle 31, various types of vehicle state detection information from a throttle opening degree sensor 74 that detects a throttle opening degree, a vehicle speed sensor 75, and an engine rotational speed sensor 76 that detects an engine rotational speed, and the like and controls operations of an ignition device 46 and a fuel injection device 47.

Detection information from hydraulic pressure sensors 57 and 58 and a shift operation detecting switch (a shift neutral switch) 48 to be described below is also input to the ECU 60.

Also, the ECU 60 includes a hydraulic pressure control unit (a clutch control unit) 61 and a memory 62 and functions thereof will be described below.

Referring also to FIG. 3, the clutch actuator 50 can control a liquid pressure for connecting and disconnecting the clutch device 26 according to operation control by the ECU 60. The clutch actuator 50 includes an electric motor 52 (hereinafter simply referred to as a motor 52) serving as a drive source and a master cylinder 51 driven by the motor 52. The clutch actuator 50 constitutes an integrated clutch control unit 50A together with the hydraulic circuit device 53 provided between the master cylinder 51 and a hydraulic pressure supply-discharge port 50p.

The ECU 60 calculates a target value of a hydraulic pressure (a target hydraulic pressure) supplied to a slave cylinder 28 for connecting and disconnecting the clutch device 26 on the basis of a preset calculation program and controls the clutch control unit 50A such that a hydraulic pressure (a slave hydraulic pressure) of the slave cylinder 28 side detected by the downstream-side hydraulic pressure sensor 58 is close to the target hydraulic pressure.

The master cylinder 51 causes a piston 51b inside a cylinder main body 51a to perform a stroke in accordance with driving of the motor 52 and enables hydraulic oil inside the cylinder main body 51a to be supplied and discharged with respect to the slave cylinder 28. In FIG. 3, reference symbol 55 denotes a conversion mechanism serving as a ball screw mechanism, reference symbol 54 denotes a transmission mechanism disposed across the motor 52 and the conversion mechanism 55, and reference symbol 51e denotes a reservoir connected to the master cylinder 51.

The hydraulic circuit device 53 includes a valve mechanism (a solenoid valve 56) for opening or blocking a middle portion of a main oil path (a hydraulic pressure supply/discharge oil path) 53m extending from the master cylinder 51 to the clutch device 26 side (the slave cylinder 28 side). The main oil path 53m of the hydraulic circuit device 53 can be divided into an upstream-side oil path 53a that is on the master cylinder 51 side from the solenoid valve 56 and a downstream-side oil path 53b that is on the slave cylinder 28 side from the solenoid valve 56. The hydraulic circuit device 53 further includes a bypass oil path 53c that bypasses the solenoid valve 56 and causes the upstream-side oil path 53a and the downstream-side oil path 53b to communicate with each other.

The solenoid valve 56 is a so-called normal open valve. A one-way valve 53c1 for causing hydraulic oil to flow in only one way from the upstream side to the downstream side is provided on the bypass oil path 53c. On the upstream side of the solenoid valve 56, an upstream-side hydraulic pressure sensor 57 for detecting a hydraulic pressure of the upstream-side oil path 53a is provided. On the downstream side of the solenoid valve 56, the downstream-side hydraulic pressure sensor 58 for detecting a hydraulic pressure of the downstream-side oil path 53b is provided.

As illustrated in FIG. 1, for example, the clutch control unit 50A is accommodated in the rear cowl 9a. The slave cylinder 28 is attached to the left side of the rear part of the crank case 15. The clutch control unit 50A and the slave cylinder 28 are connected via a hydraulic piping 53e (see FIG. 3).

As illustrated in FIG. 2, the slave cylinder 28 is coaxially disposed in the left direction of the main shaft 22. When a hydraulic pressure is supplied from the clutch actuator 50, the slave cylinder 28 presses a push load 28a passing through the inside of the main shaft 22 in the right direction. By pressing the push load 28a in the right direction, the slave cylinder 28 causes the clutch device 26 to operate in a connected state via the push load 28a. When there is no supply of the hydraulic pressure, the slave cylinder 28 releases the pressing of the push load 28a and returns the clutch device 26 to a disconnected state.

In order to maintain the clutch device 26 in the connected state, it is necessary to continue the supply of the hydraulic pressure and electric power is consumed to that extent. Therefore, as illustrated in FIG. 3, the solenoid valve 56 is provided in the hydraulic circuit device 53 of the clutch control unit 50A and the solenoid valve 56 is closed after the supply of the hydraulic pressure to the clutch device 26 side. Thereby, the hydraulic pressure supplied to the clutch device 26 side is maintained and a hydraulic pressure corresponding to a decrease in the pressure is configured to be supplemented (recharged by an amount corresponding to a leak), so that the energy consumption is inhibited.

<Clutch Control>

Figure 5:
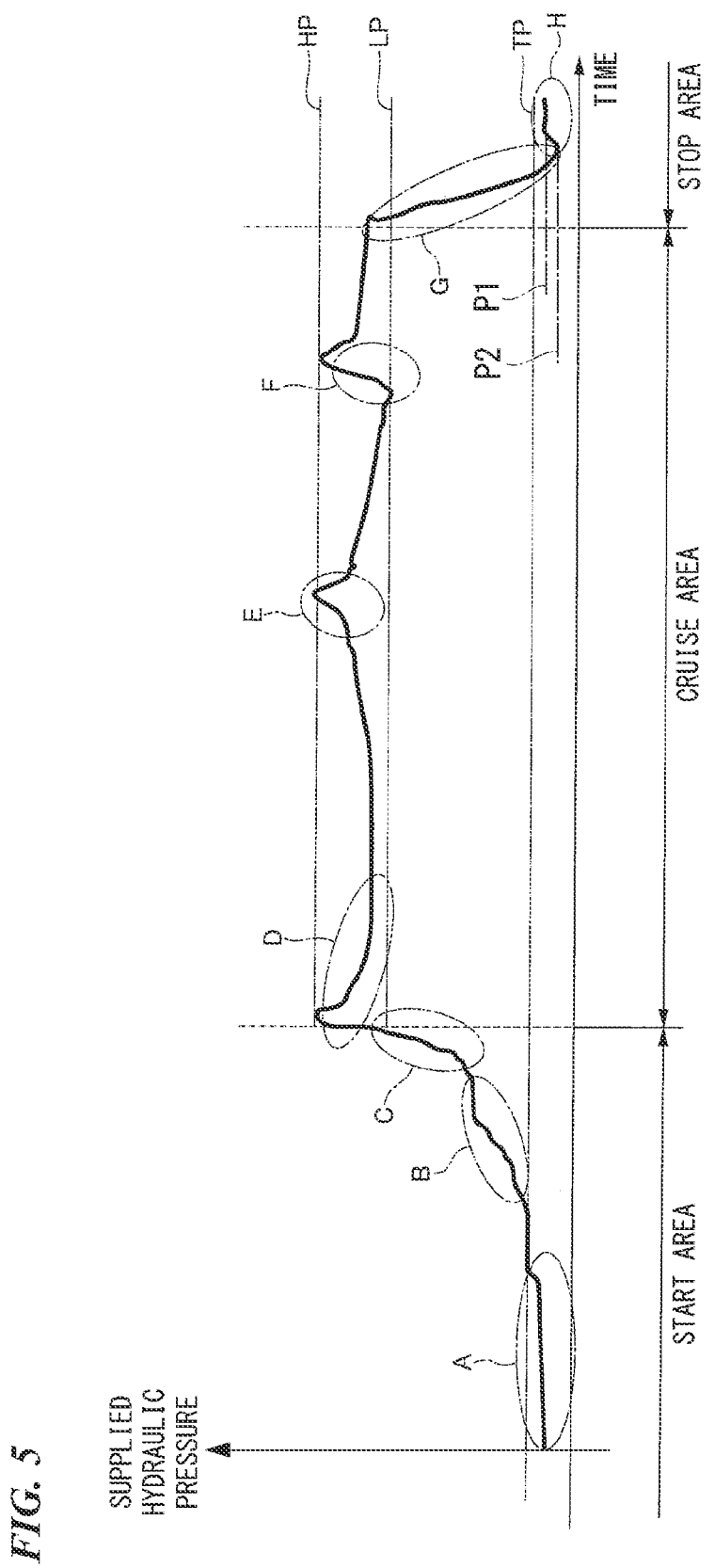
FIG. 5 is a graph illustrating a change in a supplied hydraulic pressure of the clutch actuator.

Next, an action of the clutch control system will be described with reference to a graph of FIG. 5. In the graph of FIG. 5, the vertical axis represents a supplied hydraulic pressure detected by the downstream-side hydraulic pressure sensor 58 and the horizontal axis represents elapsed time.

At the time of stopping (idling) of the motorcycle 1, the solenoid valve 56 controlled by the ECU 60 is in a valve open state. At this time, the slave cylinder 28 side (the downstream side) is in a low-pressure state having a pressure lower than a touch point hydraulic pressure TP and the clutch device 26 is in a non-fastened state (a disconnected state or a released state). This state corresponds to an area A of FIG. 5.

When the vehicle is in the in-gear stop state, electric power is supplied to the motor 52 and the low hydraulic pressure is generated. This is to immediately continue the connection of the clutch and start the vehicle.

When the motorcycle 1 is started, electric power is supplied only to the motor 52, and a hydraulic pressure is supplied from the master cylinder 51 to the slave cylinder 28 through the solenoid valve 56 of the valve open state if the rotational speed of the engine 13 is increased. When the hydraulic pressure of the slave cylinder 28 side (the downstream side) is increased to the touch point hydraulic pressure TP or higher, the fastening of the clutch device 26 is started and the clutch device 26 enters a half-clutch state in which partial motive power can be transmitted. Thereby, the motorcycle 1 can be smoothly started. This state corresponds to an area B of FIG. 5.

Thereafter, when a difference between input rotation and output rotation of the clutch device 26 decreases and the hydraulic pressure of the slave cylinder 28 side (the downstream side) reaches a lower limit retaining hydraulic pressure LP, the fastening of the clutch device 26 transitions to a locked state and all the driving force of the engine 13 is transmitted to the transmission 21. This state corresponds to an area C of FIG. 5. The areas A to C form a start area.

When a hydraulic pressure is supplied from the master cylinder 51 side to the slave cylinder 28 side, the solenoid valve 56 is in the valve open state, the motor 52 is driven to rotate in a normal direction according to the application of an electric current to the motor 52, and the master cylinder 51 is pressed. Thereby, the hydraulic pressure of the slave cylinder 28 side is adjusted to a clutch fastening hydraulic pressure. At this time, the driving of the clutch actuator 50 is subjected to feedback control on the basis of a hydraulic pressure detected by the downstream-side hydraulic pressure sensor 58.

When the hydraulic pressure of the slave cylinder 28 side (the downstream side) reaches an upper limit retaining hydraulic pressure HP, electric power is supplied to the solenoid valve 56, the solenoid valve 56 performs a valve closing operation, the supply of electric power to the motor 52 is stopped, and the generation of the hydraulic pressure is stopped. That is, the upstream side enters a low pressure state in accordance with the release of the hydraulic pressure, whereas the downstream side is maintained in the high pressure state (the upper limit retaining hydraulic pressure HP). Thereby, without the master cylinder 51 generating a hydraulic pressure, the clutch device 26 is maintained in the fastened state, and the power consumption can be inhibited while running of the motorcycle 1 is enabled.

Here, a shift may also be performed immediately after a hydraulic pressure is filled in the clutch device 26 according to a shift operation. In this case, before the solenoid valve 56 performs a valve closing operation and causes the upstream side to enter a low pressure state, the motor 52 is reversely driven in a valve open state of the solenoid valve 56 and depressurizes the master cylinder 51 and communicates with the reservoir 51e to relieve hydraulic pressure of the clutch device 26 side to the master cylinder 51 side. At this time, the driving of the clutch actuator 50 is subjected to feedback control on the basis of a hydraulic pressure detected by the upstream-side hydraulic pressure sensor 57.

Even if the solenoid valve 56 is closed and the clutch device 26 is maintained in the fastened state, the hydraulic pressure of the downstream side gradually decreases (leaks) as in an area D of FIG. 5. That is, the hydraulic pressure of the downstream side gradually decreases due to primary causes such as a leakage of the hydraulic pressure and a temperature decrease according to deformation and the like of seals of the solenoid valve 56 and the one-way valve 53c1.

On the other hand, as in the area E of FIG. 5, a hydraulic pressure of the downstream side may also be increased due to an increase in the temperature or the like. Because any small change in the hydraulic pressure of the downstream side can be absorbed by an accumulator (not illustrated) and the motor 52 and the solenoid valve 56 are operated every time the hydraulic pressure changes, power consumption is not increased.

As in an area E of FIG. 5, when a hydraulic pressure of the downstream side has increased to the upper limit retaining hydraulic pressure HP, the solenoid valve 56 is set in a valve open state in a stepwise manner due to a decrease in the supply of electric power to the solenoid valve 56 or the like and the hydraulic pressure of the downstream side is relieved toward the upstream side.

As in an area F of FIG. 5, when the hydraulic pressure of the downstream side has decreased to the lower limit retaining hydraulic pressure LP, the supply of electric power to the motor 52 is started in a state in which the solenoid valve 56 has been closed and the hydraulic pressure of the upstream side is increased. When the hydraulic pressure of the upstream side is higher than the hydraulic pressure of the downstream side, this hydraulic pressure is supplied (recharged) to the downstream side via the bypass oil path 53c and the one-way valve 53c1. When the hydraulic pressure of the downstream side becomes the upper limit retaining hydraulic pressure HP, the supply of electric power to the motor 52 is stopped and the generation of the hydraulic pressure is stopped. Thereby, the hydraulic pressure of the downstream side is maintained between the upper limit retaining hydraulic pressure HP and the lower limit retaining hydraulic pressure LP and the clutch device 26 is maintained in the fastened state. The areas D to F are set as a cruise area.

If the transmission 21 becomes neutral when the motorcycle 1 is stopped, the supply of electric power to the motor 52 and the solenoid valve 56 is stopped together. Thereby, the master cylinder 51 stops the generation of a hydraulic pressure and stops the supply of a hydraulic pressure to the slave cylinder 28. The solenoid valve 56 is in a valve open state and the hydraulic pressure within the downstream-side oil path 53b is returned to the reservoir 51e. According to the above, the slave cylinder 28 side (the downstream side) is in a low pressure state with a hydraulic pressure lower than the touch point hydraulic pressure TP and the clutch device 26 is in a non-fastened state. This state corresponds to areas G and H of FIG. 5. The areas G and H are set as a stop area.

If the transmission 21 is in the neutral state when the motorcycle 1 is stopped, the supply of electric power to the motor 52 is cut off and the motorcycle 1 is in the stopped state. Thus, the hydraulic pressure is close to zero.

On the other hand, if the transmission 21 remains in an in-gear state when the motorcycle 1 stops, a standby state in which a standby hydraulic pressure WP is applied to the slave cylinder 28 side is formed.

The standby hydraulic pressure WP is a hydraulic pressure that is slightly lower than the touch point hydraulic pressure TP at which the connection of the clutch device 26 starts and is a hydraulic pressure (a hydraulic pressure applied to the areas A and H of FIG. 5) at which the clutch device 26 is not connected. In accordance with the application of the standby hydraulic pressure WP, ineffective stroke elimination for the clutch device 26 (the cancellation of a backlash or operating reaction force of each part, the application of a preload to a hydraulic path, or the like) can be performed and operation responsiveness at the time of the connection of the clutch device 26 is improved.

<Shift Control>

Next, shift control of the motorcycle 1 will be described.

In an in-gear stop state in which a gear position of the transmission 21 is in an in-gear state of the first speed and a vehicle speed is lower than a setting value corresponding to stopping, the motorcycle 1 according to the present embodiment performs control for decreasing the standby hydraulic pressure WP supplied to the slave cylinder 28 when a shift operation on the shift pedal 32 from the first speed to neutral is performed.

Here, when the motorcycle 1 is in the stop state and the gear position of the transmission 21 is any shift stage position other than neutral, i.e., when the transmission 21 is in the in-gear stop state, the standby hydraulic pressure WP that has been preset is supplied to the slave cylinder 28.

The standby hydraulic pressure WP is set to a first setting value P1 (see FIG. 5) that is a standard standby hydraulic pressure at normal times (in the case of a non-detected state in which a shift operation on the shift pedal 32 is not detected). Thereby, the clutch device 26 is in a standby state in which the ineffective stroke elimination has been performed and the responsiveness at the time of clutch fastening is improved. That is, when the rotational speed of the engine 13 is increased by the driver increasing a degree of throttle opening, the fastening of the clutch device 26 is immediately started in accordance with the supply of a hydraulic pressure to the slave cylinder 28 and quick start and acceleration of the motorcycle 1 can be performed.

The motorcycle 1 includes a shift operation detecting switch 48 in addition to the shift load sensor 73 so that the driver's shift operation on the shift pedal 32 is detected.

In the in-gear stop state, when the shift operation detecting switch 48 detects a shift operation from the first speed to neutral, the hydraulic pressure control unit 61 performs control for setting the standby hydraulic pressure WP to a second setting value P2 (a low standby hydraulic pressure; see FIG. 5) lower than the first setting value P1 before the shift operation.

When the transmission 21 is in the in-gear state, the standard standby hydraulic pressure corresponding to the first setting value P1 is supplied to the slave cylinder 28 at normal times, so that so-called dragging is slightly generated in the clutch device 26. At this time, a dog and a slot (a dog hole) engaged with each other in the dog clutch of the transmission 21 may press each other in the rotation direction and cause resistance to disengagement and the shift operation may become heavy. In this case, if the standby hydraulic pressure WP supplied to the slave cylinder 28 is decreased to a low standby hydraulic pressure corresponding to the second setting value P2, the engagement between the dog and the slot can be easily released and the shift operation becomes light.

<Clutch Control Mode>

Figure 6:
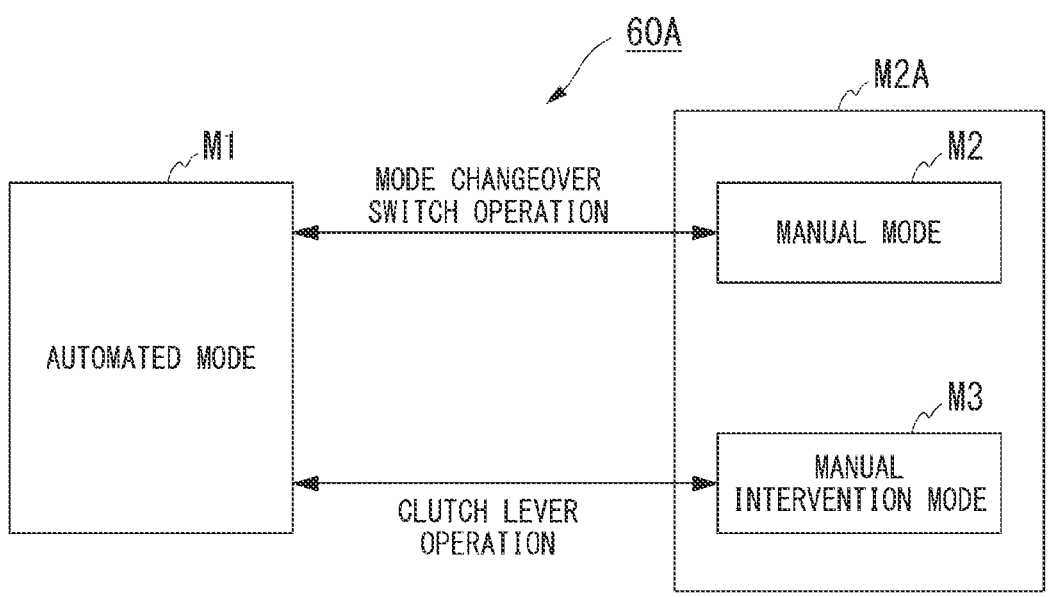
FIG. 6 is an explanatory diagram illustrating the transition of a clutch control mode according to the embodiment of the present invention.

As illustrated in FIG. 6, the clutch control device 60A according to the present embodiment has three types of clutch control modes. The clutch control mode appropriately transitions between three types of modes including an automated mode M1 in which automated control is performed, a manual mode M2 in which a manual operation is performed, and a manual intervention mode M3 in which a temporary manual operation is performed in accordance with external operations on a clutch control mode changeover switch (a mode changeover switch) 59 (see FIG. 4), a clutch lever (a clutch operating element) 4b (see FIG. 1), and the shift pedal (a shift operating element) 32 (see FIG. 1). Also, targets including the manual mode M2 and the manual intervention mode M3 will be referred to as a manual system M2A.

The automated mode M1 is a mode in which the clutch device 26 is controlled by calculating a clutch capacity suitable for a traveling state in accordance with automated start/shift control. The manual mode M2 is a mode in which the clutch device 26 is controlled by calculating a clutch capacity in accordance with an occupant's clutch operation instruction. The manual intervention mode M3 is a temporary manual operation mode in which the clutch device 26 is controlled by receiving a clutch operation instruction from the occupant during the automated mode M1 and calculating a clutch capacity from the clutch operation instruction. Also, the manual intervention mode is set such that the mode is returned to the automated mode M1 when the occupant stops (completely releases) the operation on the clutch lever 4b during the manual intervention mode M3.

The clutch control device 60A according to the present embodiment generates a clutch control hydraulic pressure by driving the clutch actuator 50 (see FIG. 3). Thus, the clutch control device 60A starts control from a clutch off state (a disconnected state) in the automated mode M1 at the time of system startup. Also, because a clutch operation is unnecessary when the engine 13 is stopped, the clutch control device 60A is set to return to the clutch off state in the automated mode M1.

In the embodiment, the clutch control device 60A constitutes the clutch control system together with the clutch lever 4b.

Basically, in the automated mode M1, clutch control is automatically performed and the motorcycle 1 is enabled to travel without any lever operation. In the automated mode M1, a clutch capacity is controlled according to a degree of throttle opening, an engine rotational speed, a vehicle speed, and a shift sensor output. Thereby, the motorcycle 1 can start without an engine failure (engine stop) in only a throttle operation and a shift can be performed in only a shift operation. However, at the time of an extremely low speed corresponding to idling, the clutch device 26 may be automatically disconnected. Also, by gripping the clutch lever 4b in the automated mode M1, the mode is switched to the manual intervention mode M3 and the clutch device 26 can be arbitrarily disconnected.

On the other hand, in the manual mode M2, a clutch capacity is controlled according to a lever operation by the occupant. Switching between the automated mode M1 and the manual mode M2 can be performed by operating the clutch control mode changeover switch 59 (see FIG. 4) while the vehicle is stopped. Also, the clutch control device 60A may include an indicator indicating validity of a lever operation at the time of the transition to the manual system M2A (the manual mode M2 or the manual intervention mode M3).

In the manual mode M2, basically, clutch control is manually performed and a clutch hydraulic pressure can be controlled in accordance with an operation angle of the clutch lever 4b. Thereby, the connection and disconnection of the clutch device 26 can be controlled in accordance with the occupant's intention and the vehicle can also travel by the clutch device 26 being connected at the time of an extremely low speed corresponding to idling. However, an engine failure may be caused due to a lever operation and automatic starting in only a throttle operation cannot be performed. Also, clutch control is automatically performed through intervention at the time of a shift operation in the manual mode M2.

Although the connection and disconnection of the clutch device 26 are automatically performed by the clutch actuator 50 in the automated mode M1, a manual operation can be temporarily performed through intervention in the automated control of the clutch device 26 when a manual clutch operation is performed on the clutch lever 4b (the manual intervention mode M3).

<Manual Clutch Operation>

As illustrated in FIG. 1, the clutch lever 4b serving as a manual clutch operating element is attached to a base side (an inner side in the vehicle width direction) of the left grip of the steering handle 4a. The clutch lever 4b has no mechanical connection with the clutch device 26 using a cable, a hydraulic pressure, or the like and functions as an operating element for transmitting a clutch operation request signal to the ECU 60. That is, the motorcycle 1 employs a clutch-by-wire system in which the clutch lever 4b and the clutch device 26 are electrically connected to each other.

Referring also to FIG. 4, the clutch lever operation amount sensor 4c, which detects the amount of operation (the rotation angle) of the clutch lever 4b, is integrally provided in the clutch lever 4b. The clutch lever operation amount sensor 4c converts the amount of operation of the clutch lever 4b into an electrical signal and outputs the electrical signal. In a state in which the operation on the clutch lever 4b is valid (the manual system M2A), the ECU 60 drives the clutch actuator 50 on the basis of an output of the clutch lever operation amount sensor 4c. Also, the clutch lever 4b and the clutch lever operation amount sensor 4c may be formed as an integrated body or separate bodies.

The motorcycle 1 includes the clutch control mode changeover switch 59 that switches between control modes of a clutch operation. The clutch control mode changeover switch 59 can arbitrarily perform switching between the automated mode M1 in which clutch control is automatically performed under a given condition and the manual mode M2 in which clutch control is manually performed in accordance with an operation on the clutch lever 4b. For example, the clutch control mode changeover switch 59 is provided in a handle switch attached to the steering handle 4a. Thereby, the occupant can easily operate the clutch control mode changeover switch 59 at the time of normal driving.

<Control Mode of Clutch-by-Wire System>

FIG. 7 is a diagram illustrating an example of the control mode of the clutch-by-wire system.

As illustrated in FIG. 7, the clutch-by-wire system has an automated mode M1 and a manual mode M2. The clutch-by-wire system can change the settings of the automated mode M1 and the manual mode M2. A changeover between the automated mode M1 and the manual mode M2 is performed according to whether to operate a mode changeover switch (not illustrated) or a specified shift operation on another operation unit 80 to be described below when the vehicle is stopped or the gear position is in neutral. In FIG. 7, the "start" is the start when the vehicle starts, the "shift" is the shift when the shift is performed while the vehicle is traveling, the "stop" is the stop when the vehicle stops after deceleration, and the "lever" is the clutch lever 4b (see FIG. 4).

In the automated mode M1, the vehicle can basically travel without any operation on the clutch lever 4b. In the automated mode M1, the driver only performs the shift operation on the transmission 21 (a foot operation on the shift pedal 32) without performing a disconnection operation on the clutch device 26. At this time, the clutch device 26 is automatically connected and disconnected by electrical control in accordance with an operation on the shift pedal 32. Also, in the automated mode M1, the clutch can be arbitrarily disconnected by gripping the clutch lever 4b. In the automated mode M1, because engine failure avoidance control is provided, the engine does not fail by operating the clutch lever.

When the vehicle starts, the vehicle can start automatically while the engine failure is avoided simply by operating the throttle without gripping the clutch lever 4b in the automated mode M1. It is also possible to temporarily implement the intervention of the manual operation in the automated mode M1 when the vehicle starts. For example, when the vehicle starts, the vehicle can start manually while avoiding the engine failure in the automated mode M1.

At the time of the shift while the vehicle is traveling, in the automated mode M1, the shift is basically enabled according to only the shift operation and the intervention of the clutch control is automatically implemented at the time of the shift operation. Also, at the time of the shift while the vehicle is traveling, in the automated mode M1, the intervention of the manual operation can be temporarily implemented. For example, at the time of the shift while the vehicle is traveling, it is possible to perform the manual shift while avoiding the engine failure in the automated mode M1.

When the vehicle is stopped after deceleration, the clutch off state is automatically brought about in the automated mode M1. Also, when the vehicle is stopped after deceleration, the intervention of the manual operation can be temporarily implemented in the automated mode M1. For example, when the vehicle is stopped after deceleration, the clutch can be turned off according to the manual operation in the automated mode M1.

Although the operation is basically a manual operation in the manual mode M2, the intervention of the clutch control is implemented only at the time of the shift. In the manual mode M2, the engine failure may occur due to the clutch lever operation because the engine failure avoidance control is not provided.

When the vehicle starts, the manual start based on the clutch lever operation and the throttle operation is possible in the manual mode M2. In the manual mode M2, the automated start based on only the throttle operation is not possible.

At the time of the shift while the vehicle is traveling, the manual shift based on the clutch lever operation and the shift operation is possible in the manual mode M2 basically. Also, the shift based on only the shift operation is possible without any operation on the clutch lever. In this case, the intervention of the clutch control is implemented.

When the vehicle is stopped after deceleration, the clutch off state is given according to the manual operation in the manual mode M2. For example, when the vehicle is stopped after deceleration, the clutch is in the disconnected state according to the clutch lever operation in the manual mode M2 and the gear position of the transmission is changed to the in-gear state of the first speed according to the shift operation and then is changed from the first speed to the neutral state.

When the vehicle is stopped after deceleration, it is determined that mode misrecognition of the driver has occurred if the shift operation is performed even though there is no operation on the clutch lever 4b in the manual mode M2, and the control of the changeover from the manual mode M2 to the automated mode M1 is executed.

<Clutch Control in Automated Mode>

Figure 8:
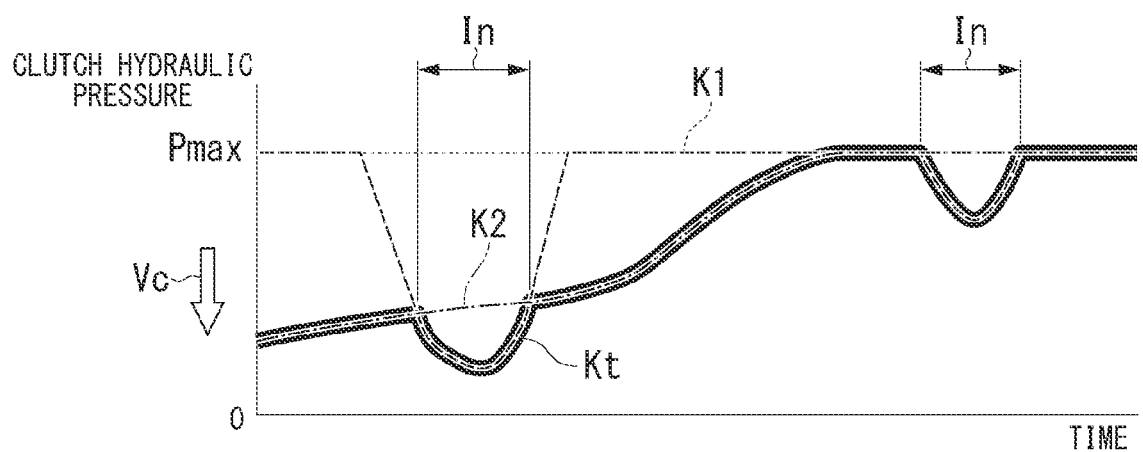
FIG. 8 is a diagram illustrating an example of clutch control in an automated mode according to the embodiment of the present invention.

FIG. 8 is a diagram illustrating an example of clutch control in the automated mode according to the embodiment. In FIG. 8, the horizontal axis represents time and the vertical axis represents a clutch hydraulic pressure. In FIG. 8, reference symbol K1 denotes a target clutch hydraulic pressure based on the clutch lever operation, reference symbol K2 denotes a target clutch hydraulic pressure based on the automated control, reference symbol Kt denotes a target clutch hydraulic pressure, reference symbol Pmax denotes a maximum hydraulic pressure of the clutch connection, an arrow Vc direction is a clutch disconnection direction, and reference symbol In denotes an intervention range (an intervention range of the manual operation).

As illustrated in FIG. 8, in the automated mode M1, the target clutch hydraulic pressure Kt is set by selecting a lower target clutch hydraulic pressure between the target clutch hydraulic pressure K2 based on the automated control and the target clutch hydraulic pressure K1 based on the clutch lever operation. That is, in the automated mode M1, the clutch is controlled by a LOW select operation on the target hydraulic pressures on an auto side and a manual side. Thereby, the vehicle can be started with only the throttle operation without the engine failure. In addition, the clutch can be arbitrarily disconnected by gripping the clutch lever 4b.

<Clutch Control in Manual Mode>

Figure 9:
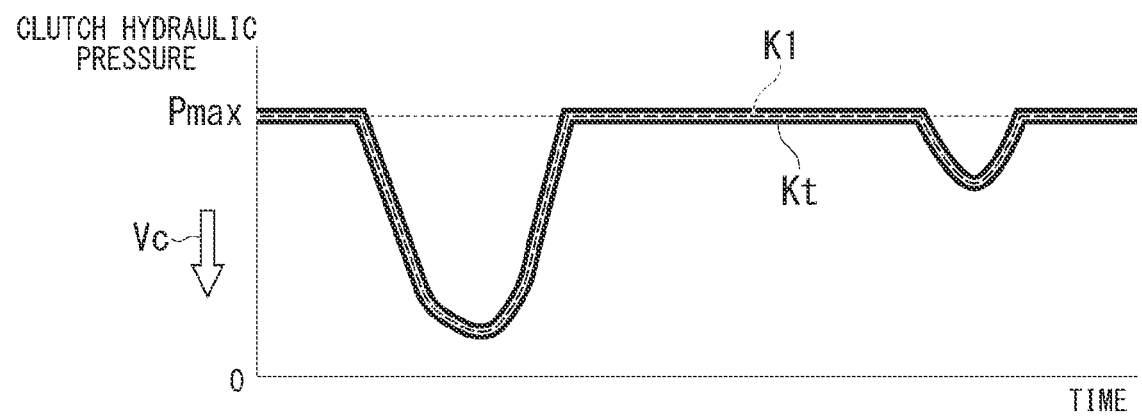
FIG. 9 is a diagram illustrating an example of clutch control in a manual mode according to the embodiment of the present invention.

FIG. 9 is a diagram illustrating an example of clutch control in the manual mode according to the embodiment. In FIG. 9, the horizontal axis represents time and the vertical axis represents a clutch hydraulic pressure. In FIG. 9, reference symbol K1 denotes a target clutch hydraulic pressure based on the clutch lever operation, reference symbol Kt denotes a target clutch hydraulic pressure, reference symbol Pmax denotes a maximum hydraulic pressure of the clutch connection, and an arrow Vc direction is a clutch disconnection direction.

As illustrated in FIG. 9, in the manual mode M2, the target clutch hydraulic pressure K2 based on the clutch lever operation is set as the target clutch hydraulic pressure Kt. That is, in the manual mode M2, the clutch hydraulic pressure can be controlled in accordance with an operation angle of the clutch lever 4b. Thereby, it is possible to control the connection and disconnection of the clutch according to the intention of the occupant. In addition, the vehicle can also travel by connecting the clutch at an extremely low speed corresponding to idling.

<Automated Mode Changeover Control>

The transmission system (the transmission device) of the present embodiment is configured to include a clutch control mode changeover switch 59, another operation unit 80, and an ECU (control unit) 60. The transmission system has control modes of the manual mode M2 in which the start/stopping/shift is performed according to an operation on the clutch lever 4b (see FIG. 4) and the automated mode M1 in which the start/stopping/shift is performed without any operation on the clutch lever 4b. The transmission system can perform a mode changeover between the manual mode M2 and the automated mode M1 according to the control of the ECU 60.

The ECU 60 can perform a changeover between the manual mode M2 and the automated mode M1 when the mode changeover operation has been performed from outside (the driver) with respect to the clutch control mode changeover switch 59. That is, when the control mode is the manual mode M2, the ECU 60 switches the control mode from the manual mode M2 to the automated mode M1 if the driver performs the mode changeover operation on the clutch control mode changeover switch 59. Also, when the control mode is the automated mode M1, the ECU 60 switches the control mode from the automated mode M1 to the manual mode M2 if the driver performs the mode changeover operation on the clutch control mode changeover switch 59.

Also, when a predetermined shift operation has been performed from the outside (the driver) with respect to the other operation unit 80 than the clutch control mode changeover switch 59 in a state in which the control mode is set to the manual mode M2, the ECU 60 can automatically perform a changeover between the manual mode M2 and the automated mode M1.

In the present embodiment, the clutch lever 4b and the shift pedal 32 are used as the other operation unit 80. The above-described shift operation is, for example, an operation required for the shift of the transmission 21 (including an in-gear operation from neutral).

As an example of the above-described shift operation, for example, in a state in which the control mode is set to the manual mode M2, the shift operation (for example, the in-gear operation from the neutral state) on the shift pedal 32 may be performed even though there is no operation of gripping the clutch lever 4b (there is no clutch disconnection operation). In this case, the control of the changeover from the manual mode M2 to the automated mode M1 is automatically executed.

As another example of the above-described shift operation, for example, the shift operation may be performed on the shift pedal 32 together with the clutch disconnection operation on the clutch lever 4b in a state in which the control mode is set to the automated mode M1. In this case, the control of the changeover from the automated mode M1 to the manual mode M2 is automatically executed.

Next, an example of a process performed by the ECU 60 when the mode changeover control is performed on the basis of the above-described operation on the other operation unit 80 will be described with reference to the flowchart of FIG. 10. This control flow is iteratively executed at a specified control interval (1 to 10 msec).

As illustrated in FIG. 10, the ECU 60 determines whether or not the ignition has been turned on (step S1). In step S1, the ECU 60 determines whether or not the engine has been stopped.

In the case of YES (when the ignition has been turned on and the engine has not been stopped) in step S1, the process proceeds to step S2.

On the other hand, in the case of NO (when the ignition has been turned off and the engine has been stopped) in step S1, the process is temporarily terminated.

In step S2, the ECU 60 determines whether or not the vehicle has been stopped. Here, the stopped state includes a state in which the vehicle speed is less than a setting value corresponding to the stopped state. That is, the stopped state includes a state in which the vehicle is about to stop after deceleration and a state in which the vehicle is about to start from a state in which the vehicle is completely stopped. In the embodiment, it is determined whether or not a detection result (a vehicle speed) of the vehicle speed sensor 75 (see FIG. 4) is less than a predetermined specified value (hereinafter also referred to as a "vehicle speed threshold value"). For example, the vehicle speed threshold value is set to 1 km/h.

In the case of YES (the stopped state) in step S2, the process proceeds to step S3. In the embodiment, when the vehicle speed is less than the vehicle speed threshold value (for example, 1 km/h), the process proceeds to step S3.

On the other hand, in the case of NO in step S2 (when the vehicle is traveling instead of being stopped), the process is temporarily terminated.

In step S3, the ECU 60 determines whether or not the mode has been set to the manual mode M2. In step S3, the ECU 60 determines whether the mode has been set to the manual mode M2 or the automated mode M1.

In the case of YES (when the mode has been set to the manual mode M2) in step S3, the process proceeds to step S4 (the operation detection step).

On the other hand, in the case of NO (when the mode has been set to the automated mode M1 instead of the manual mode M2) in step S3, the process is temporarily terminated.

In step S4, the ECU 60 determines whether or not there is a clutch lever operation. In step S4, the ECU 60 determines whether the state is a connected clutch state in which the clutch lever 4b is not gripped or a clutch off state (a disconnected state) in which the clutch lever 4b is gripped.

In the case of YES (the connected clutch state) in step S4, the process proceeds to step S5.

On the other hand, in the case of NO (the clutch off state) in step S4, the process is temporarily terminated.

In step S5, the ECU 60 determines whether or not the gear position is in neutral. In step S5, the ECU 60 determines whether the gear position is in the neutral state or in any shift stage position other than the neutral position.

In the case of YES (when the gear position is in neutral) in step S5, the process proceeds to step S6 (the operation detection step).

On the other hand, in the case of NO (when the gear position is in a shift stage position other than the neutral position) in step S5, the process proceeds to step S7 (the mode changeover step) and the control mode is switched from the manual mode M2 to the automated mode M1.

In step S6, the ECU 60 determines whether or not there is an in-gear operation. In step S6, the ECU 60 determines whether or not an operation for any shift stage position other than the neutral position has been performed on the shift pedal 32 from the state in which the gear position is the neutral position.

In the case of YES (when there is an in-gear operation) in step S6, the process proceeds to step S7 (the mode changeover step).

On the other hand, in the case of NO (when there is no in-gear operation) in step S6, the process is temporarily terminated.

In step S7, the ECU 60 switches the control mode from the manual mode M2 to the automated mode M1.

As described above, in the state in which the control mode is set to the manual mode M2 and the vehicle speed is determined to be less than the specified value, the ECU 60 switches the control mode from the manual mode M2 to the automated mode M1 when the shift operation has been performed on the shift pedal 32 even though there is no operation on the clutch lever 4b. That is, when the driver misrecognizes the control mode and performs the shift operation with the shift pedal 32 without operating the clutch lever 4b even though the control mode is the manual mode M2, the control mode is automatically switched to the automated mode M1.

When the control mode is switched from the manual mode M2 to the automated mode M1, the ECU 60 sets the clutch device 26 in the clutch off state (the disconnected state) as in the normal automated mode M1. Thereby, even if the transmission 21 is in the in-gear state from neutral, it is possible to prevent a shift shock from occurring or prevent the engine 13 from stopping. In response to the throttle operation, the motorcycle 1 can be started without operating the clutch lever 4b. During the subsequent traveling of the vehicle, the driver can perform only the shift operation on the transmission 21 (the foot operation on the shift pedal 32) and the clutch device 26 can be automatically connected and disconnected by electrical control in accordance with the operation on the shift pedal 32, and a so-called semi-automatic shift operation is possible.

As described above, the transmission system of the above-described embodiment executes the mode changeover between the manual mode M2 and the automated mode M1 on the basis of the mode changeover operation on the clutch control mode changeover switch 59 and executes the mode changeover between the manual mode M2 and the automated mode M1 when a predetermined shift operation has been performed on the other operation unit 80 separate from the clutch control mode changeover switch 59.

According to the above configuration, if the other operation unit 80 is the shift pedal 32 or the clutch lever 4b, it is possible to switch the control mode from the manual mode M2 to the automated mode M1 with only the normal in-gear operation, for example, in a case in which the in-gear operation is performed without the clutch disconnection operation in the manual mode M2 or the like. In this way, it is possible to simplify the mode changeover operation and execute the shift operation and the mode changeover in consideration of an intention of the driver even if it is determined that the driver is performing the shift operation by misrecognizing the control mode.

Also, in the above-described embodiment, the changeover to the automated mode M1 is executed when there is no operation on the clutch lever 4b and an operation is performed on the shift pedal 32 in a state in which the control mode is set to the manual mode M2. That is, when the specified shift operation is performed on the other operation unit 80 in the state in which the control mode is set to the manual mode M2, the changeover to the automated mode M1 is executed. Thereby, even if the driver operates the shift pedal 32 by misrecognizing the control mode as the automated mode M1, it is possible to automatically switch the control mode to the automated mode M1 and execute the shift operation and the mode changeover in consideration of an intention of the driver.

Also, in the above-described embodiment, the changeover to the automated mode M1 is executed if the in-gear operation has been performed without the clutch operation when the transmission 21 is in the neutral state. Thereby, even if the driver has performed the in-gear operation by misrecognizing the control mode, it is possible to avoid a shift shock and an engine failure by automatically switching the control mode to the automated mode M1 and execute the shift operation and the mode changeover in consideration of the intention of the driver.

Also, in the above-described embodiment, the changeover to the automated mode M1 is executed only when the vehicle speed is determined to be less than the specified value and a predetermined operation has been performed on the other operation unit 80. Thereby, the driver can perform the mode changeover unintentionally only at the time of low speed or at the time of stopping when a change in the behavior of the vehicle body is small.

The present invention is not limited to the above-described embodiment. For example, the present invention is not limited to the application to a configuration in which the clutch is connected by increasing the hydraulic pressure and the clutch is disconnected by decreasing the hydraulic pressure. The present invention may be applied to a configuration in which the clutch is disconnected by increasing the hydraulic pressure and the clutch is connected by decreasing the hydraulic pressure.

The clutch operating element is not limited to the clutch lever and a clutch pedal or various other operating elements may be used as the clutch operating element. Likewise, the shift operating element is not limited to the shift pedal and a shift switch or various other operating elements may be used as the shift operating element.

For example, when a predetermined operation is performed on the other operation unit 80 in the state in which the control mode is set to the manual mode M2, the control for the changeover to the automated mode M1 is not limited to the case of in-gearing from neutral in the stopped state. For example, the control may be performed at a shift position other than the neutral position or while the vehicle is traveling.

Although an example in which the control unit is integrated with the ECU (an example in which the ECU includes the hydraulic pressure control unit) has been described in the above-described embodiment, the present invention is not limited thereto. For example, the control unit may be separate from the ECU. For example, the transmission device may include the hydraulic control unit that is separate from the ECU.

The application is not limited to a saddle-riding type vehicle in which the clutch operation is automated as in the above-described embodiment. The present invention can also be applied to a saddle-riding type vehicle including a so-called clutch operation-less transmission device configured to enable a shift by adjusting a driving force without performing the manual clutch operation under predetermined conditions while a manual clutch operation is basically performed.

Also, the above-described saddle-riding type vehicle includes all vehicles in which the driver rides across the vehicle body and includes not only motorcycles (including motorized bicycles and scooter type vehicles) but also three-wheeled vehicles (including vehicles with one front wheel and two rear wheels and vehicles with two front wheels and one rear wheel) or four-wheeled vehicles and vehicles including an electric motor as a motor.

The configuration in the above-described embodiment is an example of the present invention and various modifications can be made without departing from the spirit of the present invention.

BRIEF DESCRIPTION OF THE REFERENCE SYMBOLS

1: Motorcycle (saddle-riding type vehicle)
4b: Clutch lever (clutch operating element)
21: Transmission
26: Clutch device
32: Shift pedal (shift operating element)
59: Clutch control mode changeover switch (mode changeover switch)
60: ECU (control unit)
80: Another operation unit
M1: Automated mode
M2: Manual mode
S4, S6: Operation detection step
S7: Mode changeover step

What is claim is:

1. A transmission device, which is able to switch a mode between a manual mode in which a clutch device is connected and disconnected according to an operation on a clutch operating element and an automated mode in which the clutch device is connected and disconnected without any operation on the clutch operating element, the transmission device comprising:
    a mode changeover switch on which a mode changeover operation between the manual mode and the automated mode is externally performed;
    an other operation unit on which a predetermined shift operation is externally performed separately from the mode changeover switch; and
    a control unit configured to control a mode changeover between the manual mode and the automated mode,
    wherein the control unit executes the mode changeover between the manual mode and the automated mode on the basis of the mode changeover operation on the mode changeover switch,
    wherein, when the shift operation has been performed on the other operation unit, the control unit executes the mode changeover between the manual mode and the automated mode,
    wherein the other operation unit comprises a shift operating element configured to perform an operation on a transmission, and
    wherein, when there is no operation on the clutch operating element and the operation is performed on the shift operating element in a state in which the mode is set to the manual mode, the control unit executes a changeover from the manual mode to the automated mode.

2. The transmission device according to claim 1, wherein the other operation unit comprises the clutch operating element configured to perform an operation on the clutch device.

3. The transmission device according to claim 2, wherein, if there is no operation on the clutch operating element and an in-gear operation is performed on the shift operating element when the transmission is in a neutral state in a state in which the mode is set to the manual mode, the control unit executes the changeover from the manual mode to the automated mode.

4. The transmission device according to claim 1, wherein, when a vehicle speed is less than a predetermined specified value, the control unit executes the mode changeover between the manual mode and the automated mode if the shift operation has been performed on the other operation unit.

5. A method of controlling the transmission device according to claim 1, the method comprising:
    an operation detection step of detecting that the shift operation has been performed on the other operation unit in a state in which the mode is set to the manual mode; and
    a mode changeover step of executing a changeover from the manual mode to the automated mode when it is detected that the shift operation has been performed in the operation detection step.

* * * * *